United States Patent [19]

Greenwell et al.

[11] Patent Number: 5,560,953
[45] Date of Patent: Oct. 1, 1996

[54] MODIFIED FLOUR

[75] Inventors: Philip Greenwell, Mill Hill; Christopher J. Brock, Wallingford, both of United Kingdom

[73] Assignee: Campden & Chorleywood Food Research Association, Gloucestershire, England

[21] Appl. No.: 455,933

[22] Filed: May 31, 1995

[30] Foreign Application Priority Data

May 31, 1994 [GB] United Kingdom .................. 9410883

[51] Int. Cl.$^6$ ................................ A21D 2/08; A21D 2/00
[52] U.S. Cl. ..................... 426/549; 426/552; 426/622; 426/443; 426/442; 426/312; 426/318
[58] Field of Search ..................................... 426/549, 552, 426/622, 443, 442, 312, 318

[56] References Cited

U.S. PATENT DOCUMENTS

| 1,685,220 | 9/1928 | Middleton . | |
|---|---|---|---|
| 3,859,449 | 1/1975 | Rubio . | |
| 4,885,180 | 12/1989 | Cochran et al. | 426/241 |

FOREIGN PATENT DOCUMENTS

| 1110711 | 4/1968 | United Kingdom . |
| 1444173 | 7/1976 | United Kingdom . |
| 2002222 | 3/1982 | United Kingdom . |

OTHER PUBLICATIONS

J. W. Montzheimer, A Study of Methods for Testing Cake Flour, pp. 510–517, May 1931, Centennial Mill Company, Spokane Washington.

William F. Sollars, Cake and Cookie Flour Fractions affected by Chlorine Bleaching, pp. 100–110, Mar. 1958.

W. F. Sollars et al, Performance of Wheat and Other Starches in Reconstituted Flours, pp. 396–411, Jul. and Aug. 1971.

Masaharu Seguchi, Effect of Chlorination on the Hydrophobicity of Wheat Starch, pp. 281 and 282, American Association of Cereal Chemist, Inc., Feb. 1987.

M. Seguchi, Contribution of Wheat Starch Granule Hydrophobicity to Pancake Texture, pp. 493–497, American Association of Cereal Chemist, Inc., Jul. 1993.

Philip Greenwell and Christopher J. Brock, Cereal Foods World, vol. 38, No. 8, Item 115, pp. 615 and 616, Aug. 1993.

Philip Greenwell, Wheat Endosperm Texture, pp. 9–11, Flour Milling and Baking Research Association.

Charles A. Burkhard et al, Derivatives of Starch, pp. 59–61, Rayon Textile Monthly, Jun. 1942.

L. T. Kissell et al, Design and Construction of a Reactor for Gaseous–Treatment of Flour, pp. 152–161, Cereal Science Today, vol. 17 No. 6, Jun. 1972.

Primary Examiner—Esther M. Kepplinger
Assistant Examiner—Choon P. Koh
Attorney, Agent, or Firm—Lowe, Price, LeBlanc & Becker

[57] ABSTRACT

The invention relates to a method for improving the baking properties of flour, which comprises treating the flour with an acylating reagent. This makes the flour particularly suitable for use in the baking of high-ratio cakes.

13 Claims, 6 Drawing Sheets

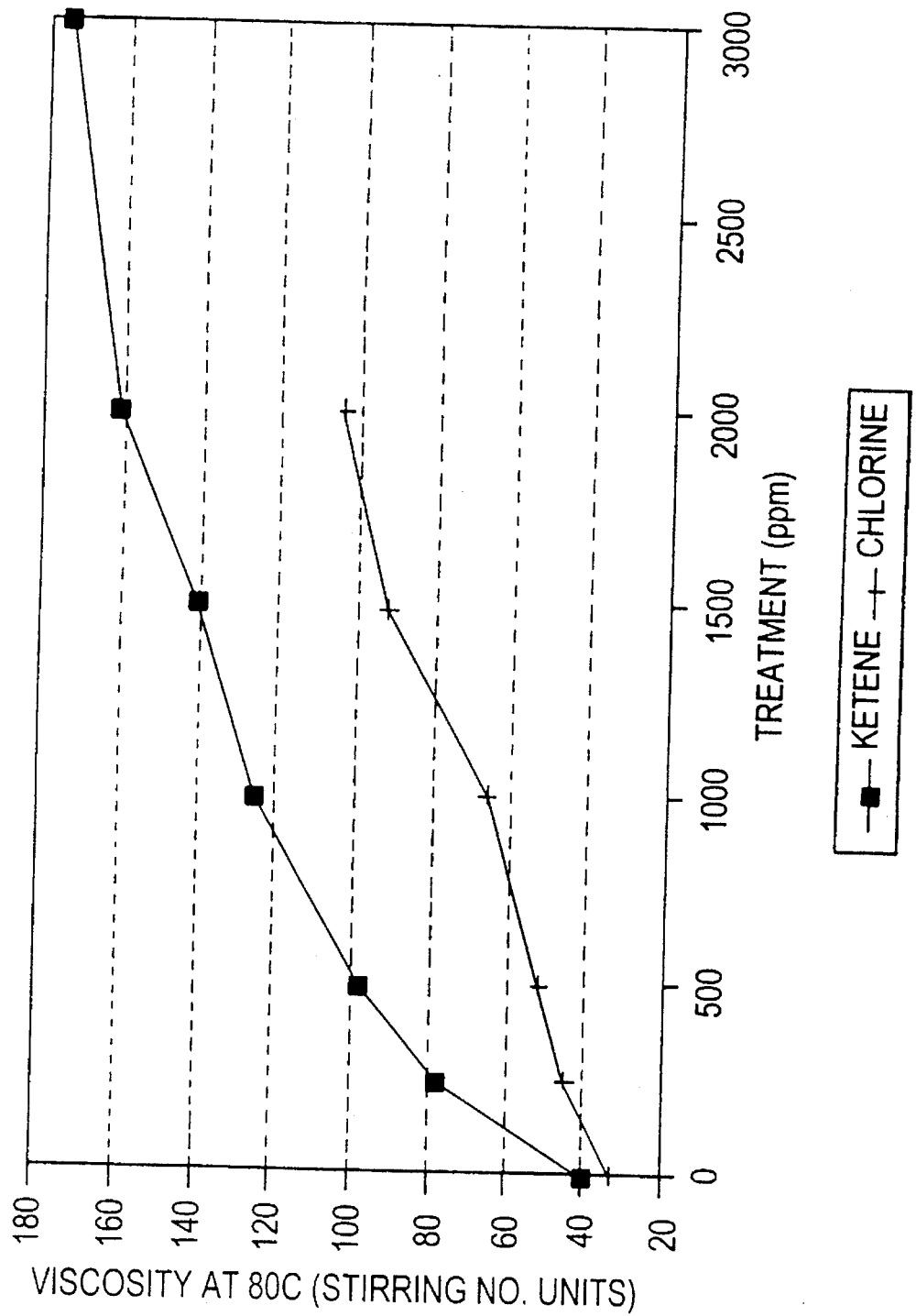

MODIFIED FLOUR

This invention relates to modified flour. More particularly the invention relates to a method of improving the baking properties of flour of wheat or other farinaceous foodstuffs used to make high-ratio cakes and other bakery products.

The name, high-ratio cake, refers to the ratio of sugar to flour in the cake formulation. This may vary from 1 to about 1.4 at its upper limit. The sugar syrup concentrations, at 50–60% w/w, are similar for both high-ratio and low-ratio cake formulations, but the level of flour in high-ratio cakes may be as low as 25–30% of the batter, compared with 35–40% in low-ratio cakes. This difference in concentration of the flour in aqueous syrup places a greater strain on the flour as it attempts to fulfil its functional role during the creation of cake structure. High-ratio cakes have a number of characteristics which make them popular with consumers, including mouth-feel (sweetness and moistness) and long shelf-life (approximately 3 weeks).

Flour which has been treated with chlorine can produce good high-ratio cakes (Montzheimer, 1931). Chlorinated flour has been used extensively in cake manufacture for over 50 years in the countries where its use is permitted (e.g. U.S.A., Canada, U.K., Ireland, Australia, New Zealand and Japan). Chlorinated flour also has properties which make its use advantageous in other bakery products such as fruit cakes, doughnuts, crumpets, muffins and wafers. Although safety evaluation has failed to detect any hazard associated with the consumption of products made from chlorinated flour there remains concern about the introduction of organo-chlorine into food, and many countries, especially in Western Europe, do not permit its use. Consequently alternatives are desirable.

Heat-treated flour has been the best alternative (Russo and Doe, 1968, Cauvain et al, 1976). Collapse can be minimised and crumb with good eating quality can be produced, though some reformulation can be necessary. However the process is more expensive than chlorination, and the time and temperature of treatment, and the moisture content of the flour have to be precisely controlled. Under-treatment leads to collapsed cakes with pasty crumb, whereas over-treatment leads to cakes with off-flavour and gritty crumb. Heat-treated flour is used commercially to a limited extent. It has not displaced chlorinated flour in most markets.

Organic acids and ethyl alcohol have been reported to improve the functionality of flour for cake baking (Nakamura et al, 1982), but they are not effective in the high-ratio (~1.3) formulations that we are concerned with here.

Untreated flours cannot be used to make satisfactory high-ratio cakes. Such cakes are collapsed and contain regions which are dense, unaerated and pasty in texture. Cake batters made from untreated flour give risen cakes within the oven, but bubble walls remain elastic and do not break to give a sponge by the end of oven rise. Consequently, during cooling air cannot penetrate the monocellular foam to replace the condensing steam. and atmospheric pressure causes collapse of the cakes. In contrast, with successfully treated flours the bubble walls become inelastic and undergo tensile rupture during the final temperature increase to create a sponge, so that on cooling, air may readily penetrate and equalise the pressure within the structure of the cake, which therefore is not damaged.

The mechanisms by which chlorination and heat-treatment change the functional properties of flour are not fully understood. Both are non-specific treatments and flour is a complex material, so it is likely that they modify many components of flour which are not relevant to its performance in high-ratio cakes. A substantial literature has developed on the subject, especially concerning chlorinated flour.

Sollars (1958) fractionated chlorinated flour into water-soluble material, gluten, starch and tailings, and showed that high-ratio-cake functionality is associated mainly with the starch fraction. He went on to show that much less chlorine is required to change the functionality of isolated starch than has to be applied to flour, confirming that most of the chlorine which reacts with flour is functionally redundant in high-ratio cakes (Sollars and Rubenthaler, 1971).

Seguchi (1987) had observed that starch from chlorinated flour was apparently more hydrophobic than starch from untreated flour, and he suggested that hydrophobic starch granules might aggregate at the surface of bubbles in batters, and stabilise the bubbles. Seguchi (1993) has gone on to suggest that chlorination of starch-granule-surface proteins may make them hydrophobic. Although the mechanism is unknown, hydrophobic starch granules seem to have a beneficial effect upon the structure of high-ratio cakes.

Heat treatment is likely to denature proteins, including those at starch granule surfaces, and expose some of the more hydrophobic side-chains of amino acids which are mainly buried in native proteins. Other, less effective, treatments, such as organic acids and ethanol could also facilitate protein denaturation.

One of the inventors, Greenwell, has shown that there are extremely basic (isoelectric point (pI)>10) lipid-binding proteins, called friabilins, on the surface of starch granules of soft-milling bread wheat (Greenwell, 1993, Greenwell and Brock, 1993). It is soft bread wheat which is chlorinated and used to make cakes and many other bakery products, because the small flour particles, consistent with batter stability, are more readily milled from soft endosperm. In addition there is a group of starch-granule-surface proteins of about 30000 Daltons which are also very basic.

A problem addressed by the present invention is to find an alternative method of improving the baking properties of flour, in particular to make the flour suitable for use in high-ratio cakes, and which avoids the use of chlorination.

This problem is solved according to the present invention by a method of improving the baking properties of flour, which comprises treating the flour with an acylating reagent.

According to this invention any type of flour may be used (e.g. wheat, barley, rye, maize, oats, rice, millet, sorghum). Preferred types of flour are wheat, barley and rye. Most preferred is wheat.

The flour is treated as milled, without subsequent addition of water to create a dough or batter (n.b. a dough starts to form at about 30% moisture on total weight basis).

The treatment is preferably carried out with a gaseous acylating reagent or with vapour from a liquid acylating reagent. The flour is preferably agitated during treatment so as to continuously change the flour surface exposed to the acylating reagent.

The acylating reagent is preferably one which lowers the pH of flour. Suitable acylating reagents include ketene, acetic anhydride, acetyl chloride, propionyl chloride, ethyl chloroformate and methyl chloroformate.

The acylating reagent is used in a proportion of up to 6000 parts per million by weight (ppm), preferably from 250 to 4000ppm, based on the weight of flour. For example, treatment may be carried out with ketene at up to 3000ppm, acetic anhydride at up to 6000ppm, acetyl chloride at up to 12800ppm, propionyl chloride at up to 3300ppm, or methyl chloroformate at up to 3380ppm.

The invention also extends to flour which has been treated by a method as defined above, and to a product which has been baked or otherwise cooked using such flour. The product may be any which is presently made using chlorinated flour, and is preferably a high-ratio cake.

We considered that the lipid bound to friabilins would make soft-bread-wheat starch granules somewhat more hydrophobic than starch granules from hard bread wheat, but that the hydrophobicity would be increased further, if the positive charges on the friabilin molecules and other proteins near the starch granule surface were to be removed and replaced by hydrophobic groups. The solubility of a protein in an aqueous medium is minimum when the pH of the medium is the same as the pI of the protein, because aggregation by intermolecular hydrophobic bonding is then least diminished by charge repulsion. Removing the positive charge from friabilins and other basic proteins would lower their isoelectric points, so that they were closer to the pH of batters, and thereby encourage formation of a hydrophobic layer of hydrophobically-bonded protein aggregates on the surface of the starch granules. Hydrophobicity would be further enhanced if the chemical group which neutralised the positive charges were itself hydrophobic (i.e. not only uncharged, but also having an entropy-driven unfavourable free energy of interaction with liquid water).

We have also found that a reagent such as ketene ($CH_2=C=O$) is suitable to achieve the above condition. Ketene undergoes nucleophilic addition with amino, sulphydryl and hydroxyl groups. The reactions with amino and sulphydryl groups should be the most rapid. The reactions with amino groups such as those within the positively-charged lysine side chains of proteins (e.g. friabilins), sulphydryl groups such as the cysteine side chains of proteins, and hydroxyl groups such as water are shown below.

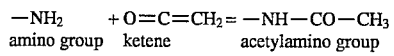
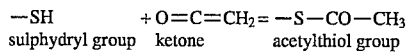
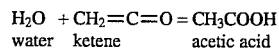

Any acetic acid generated may also enhance functionality, because of its possible protein-denaturing effect mentioned above.

Ketene may not merely reduce the pI of proteins. It may render them more nearly devoid of charge by converting negatively-charged carboxyl groups to mixed acetic anhydrides.

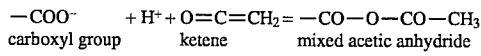

Acylating reagents other than ketene, such as diketene, isocyanic acid and isothiocyanic acid and alkyl and aryl derivatives of all these reagents, and anhydrides and acid chlorides of alkyl and aryl carboxylic acids and of carbonic acid alkyl and aryl monoesters, will remove the positive charges from proteins, by reacting covalently with and thereby reducing the pK of amino nitrogen atoms. In addition reaction with most of these reagents will lead to the addition of a hydrophobic group.

Ketene is a gas at ambient temperature and so, like chlorine, it should react efficiently with a solid substrate such as flour. It can be generated by pyrolysis of acetone, acetic anhydride or diketene, but it is unstable so it must be delivered to the flour to be modified immediately after its formation.

Liquid modifying agents may well react with flour, but it is possible to envisage problems such as clumping, difficulty in removing residues and less efficient reaction. Some other reagents are gases, or are liquids with sufficiently high vapour pressures at ambient temperature, to make vapour phase treatment of flour feasible. Examples include methyl ketene, methyl isocyanate, acetic anhydride, acetyl chloride, propionyl chloride and methyl chloroformate.

Acetylated amino acids are not toxic and neither is acetic acid. If the products of acetylation, by reagents such as ketene and acetic anhydride, break down, for example in enzyme-catalysed reactions after ingestion, it will be by simple hydrolysis to give the original molecule and a molecule of acetic acid. This is exemplified by the reaction scheme for hydrolysis of an acetylated amino group shown below.

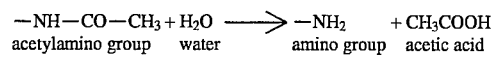

Some of the other reagents listed above, such as acetic anhydride and acetyl chloride, are permitted to acetylate starch for food use at much higher levels of treatment than would be needed to change flour functionality.

Flour pH is a useful measure of ketene treatment since both the removal of positive charges and the creation of acetic acid will tend to lower flour pH. It is measured using a glass electrode in a stirred suspension of 2g flour in 10ml water. Acetylating agents such as acetic anhydride, acetyl chloride and ketene have been used to acetylate starch. Starch is a different material from flour which is the subject of the present invention. The objective of acetylation of starch is to acetylate hydroxyl groups of the amylose and amylopectin in starch to produce starch acetate. The objective of the present invention is to acetylate, or otherwise acylate, amino groups of proteins on starch in flour in the absence of added water. As a result the conditions of treatment are also different. In order to acetylate starch much larger quantities of acetylating agent are generally used in a liquid phase reaction, and the treatment conditions are more extreme (e.g. heating in aqueous alkali).

Acetic acid, propionic acid and acetic anhydride have been reported to retard the staling and microbiological spoilage of tortillas (Rubio, 1975). Rubio treats wet maize-flour doughs, whereas we treat dry flour. The functional effect in tortillas is the retardation of staling and microbiological spoilage, whereas we are trying to improve product volume and texture. Rubio uses acetic anhydride as a source of acetic acid, which can produce the functional effect on its own in tortillas. We are specifically trying to react the acetic anhydride with flour proteins, because acetic acid cannot produce the functional effect that we are concerned with.

The invention is illustrated in the following Examples and with reference to the accompanying drawings, in which:

FIG. 6 illustrates the RVA properties of ketene-treated and chlorine-treated flour.

EXAMPLES

In the following examples "flour" refers to wheat flour.
Tests of functionality

We have used several tests to measure flour functionality. One is to examine pasting curves produced in a Rapid Visco-Analyser Model RVA-3D (Newport Scientific Pty. Ltd., Narrabeen, Australia) (RVA) under the control of the customised Thermocline and Thermoview computer software run on an IBM PC-compatible computer. Portions of water (25.0 ml) containing 16 µmoles silver nitrate (to inhibit α-amylase activity) were pipetted into the disposable aluminium sample canisters supplied with the RVA. Immediately before each portion (4.00g) of flour was processed, it was slurried into the water by ten manual plunges of the disposable plastic stirrer. The samples were subjected to the following time-temperature profile with stirring power continuously adjusted to give a constant stirring speed.

| Temperature (°C.) | Time (minutes) |
|---|---|
| 50 | 0–start |
| 50 | 1.0 |
| 95 | 4.8 |
| 95 | 7.3 |
| 50 | 11.1 |
| 50 | 15.0–end |

Figure 1:
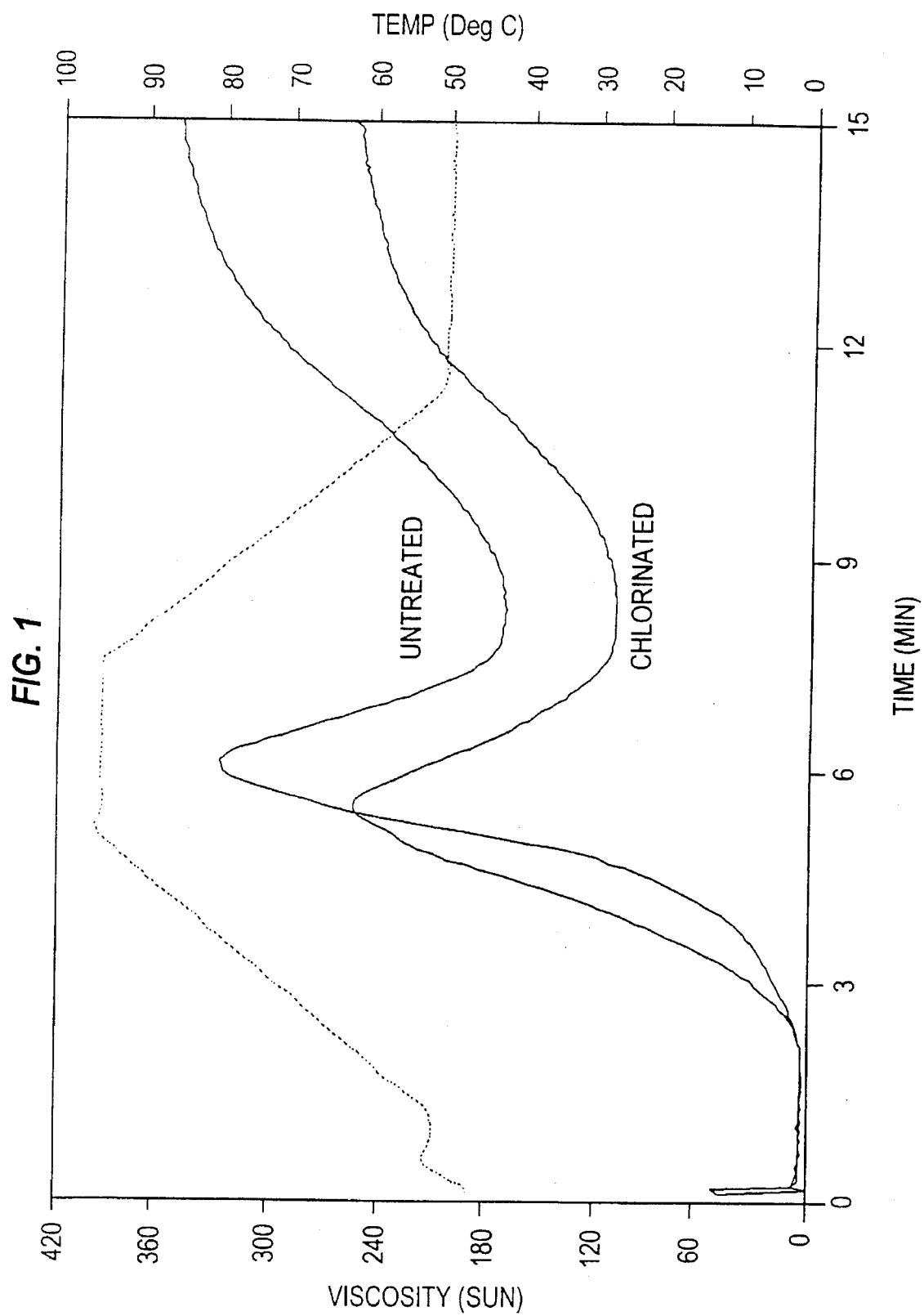
FIG. 1 illustrates pasting curves of untreated and chlorinated flour.

All the resultant pasting curves were gathered as a file of 180 viscosity value measured at 4-second intervals, and exported into the Thermoview software for plotting as a curve of power to maintain constant stirring, i.e. viscosity (arbitrary Stirring Number Units, SNU) against time. It is a characteristic of both chlorinated and heat-treated flours which make good high-ratio cakes, that the viscosity of slurries rises earlier during the heating phase in the RVA than it does with untreated flours (FIG. 1). This characteristic is consistent with the idea that the starch granules in flours suitable for making high-ratio cakes tend to form aggregates. The extent of the change detected by the RVA is measured as the viscosity (in SNU) as the temperature is rising through 80° C. compared with control samples.

The second test is to bake high-ratio cakes, using whole-egg Madeira-type recipes, either using 300 g (unit-size cake) or 45 g (muffin-size cake) batter. The methods are as follows.

| UNIT-SIZE CAKE | |
|---|---|
| Ingredient | % flour weight |
| Flour | 100 |
| Caster sugar | 130 |
| High-ratio shortening | 65 |
| Skimmed milk powder | 8 |
| Salt | 1.5 |
| Baking powder (SAPP/Bicarbonate 2:1) | 6 |
| Water | 95 |
| Whole liquid egg | 90 |
| (SAPP = sodium acid pyrophosphate) | |

All the ingredients, except the egg, were mixed in a planetary mixer fitted with a beater for 0.5min at rpm and then for 1 min at 400 rpm. The egg was added gradually over 0.5 min at 130 rpm. Mixing was completed at 400 rpm for a further 1 min. Final batter relative density should be 0.8. 300 g batter was deposited into paper-lined rectangular pans and the cakes were baked in a reel oven for 50 min at a temperature setting of 210° C.

| MUFFIN-SIZE CAKE | |
|---|---|
| Ingredient | % flour weight |
| Flour | 100 |
| Caster sugar | 130 |
| High-ratio shortening | 60 |
| Skimmed milk powder | 8 |
| Salt | 1.5 |
| Baking powder (SAPP/Bicarbonate 2:1) | 6 |
| Water | 80 |
| Whole liquid egg | 90 |

The liquids were placed in the bowl of a Kenwood domestic-scale planetary mixer fitted with a beater. The sieved dry ingredients and the fat were added and mixed on slow speed for 0.5 min and scraped down. The batter was mixed for 1.25 min on speed 5, scraping down after 0.75 min. Final batter relative density should be 0.8. 45 g batter was deposited into lined muffin tins, and the cakes were baked in a reel oven for 22 min at a temperature setting of 230° C.

After either baking test and subsequent cooling overnight the specific volumes of cakes were measured by seed displacement and their internal and external appearances were described. Cakes made using modified flours were compared with those made using the same base flour chlorinated to 1500 ppm, and those made using a commercial chlorinated flour.

Figure 2:
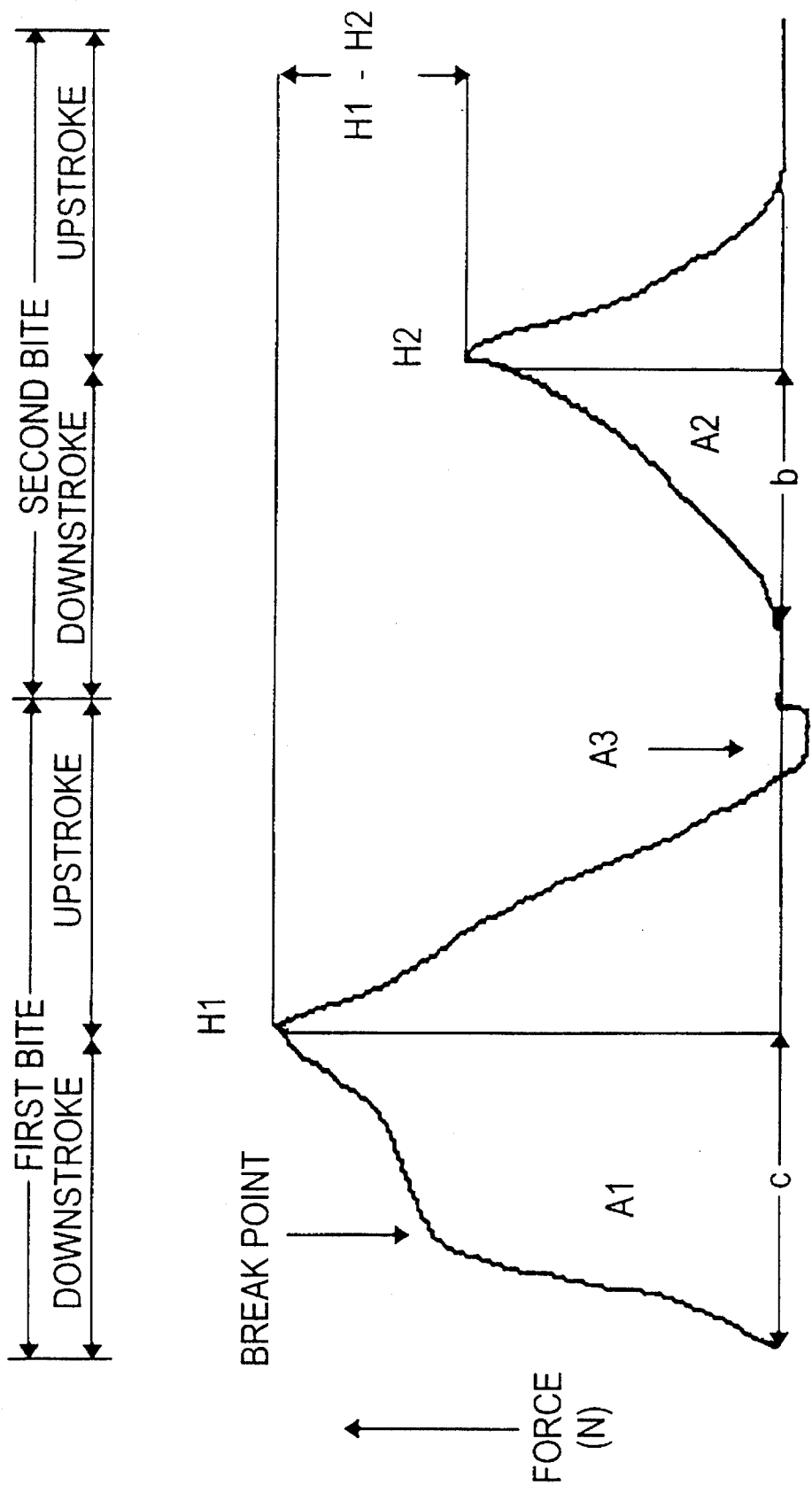
FIG. 2 illustrates a force-distance curve derived from texture profile analysis (TPA)

In some case samples taken from the cakes were examined by texture profile analysis (TPA). During TPA the sample is subjected to two compressive cycles (referred to as "bites") in a Stable Microsystems TAXT2 texture analyser, between the same limits of displacement, and a force-time curve for each "bite" is recorded. Although the magnitude of the parameters deduced is affected by experimental parameters (e.g. strain, strain rate), they provide objective comparative information about the mechanical properties of the sample under standardised conditions. The force on the sample is recorded as a function of time, from which strain can be derived readily. A typical TPA double-bite curve is shown in FIG. 2. Analysis of the force-time curve leads to the extraction of seven textural parameters; five measured and two calculated from the measured parameters. The seven textural parameters are defined as follows with the units of the parameter in parentheses.

Fracturability is the force at the first significant break point in the curve (N).

Hardness, H1, is the peak force during the first compression (N).

Cohesiveness, A2/A1, is the ratio of the positive force area during the second compression cycle to that during the first compression cycle.

Adhesiveness is the negative force area of the first bite, representing the work necessary to pull the compressing plunger away from the sample ($N.m \times 10^3$)

Recovery, $b/c \times 10^2$ is the proportion of height that the sample recovers during the time that elapse between the end of the first "bite" and the start of the second "bite" (%).

Gumminess is the product of hardness and cohesiveness (N).

Chewiness is the product of gumminess and recovery ($N \times 10^2$).

Examples of flour treatment agents and methods

Example 1

Ketene-treated flour

Ketene was generated by pyrolysis of acetone vapour on a hot Nichrome filament to yield ketene and methane.

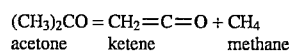

$$(CH_3)_2CO = CH_2=C=O + CH_4$$
acetone        ketene         methane

Figure 3:
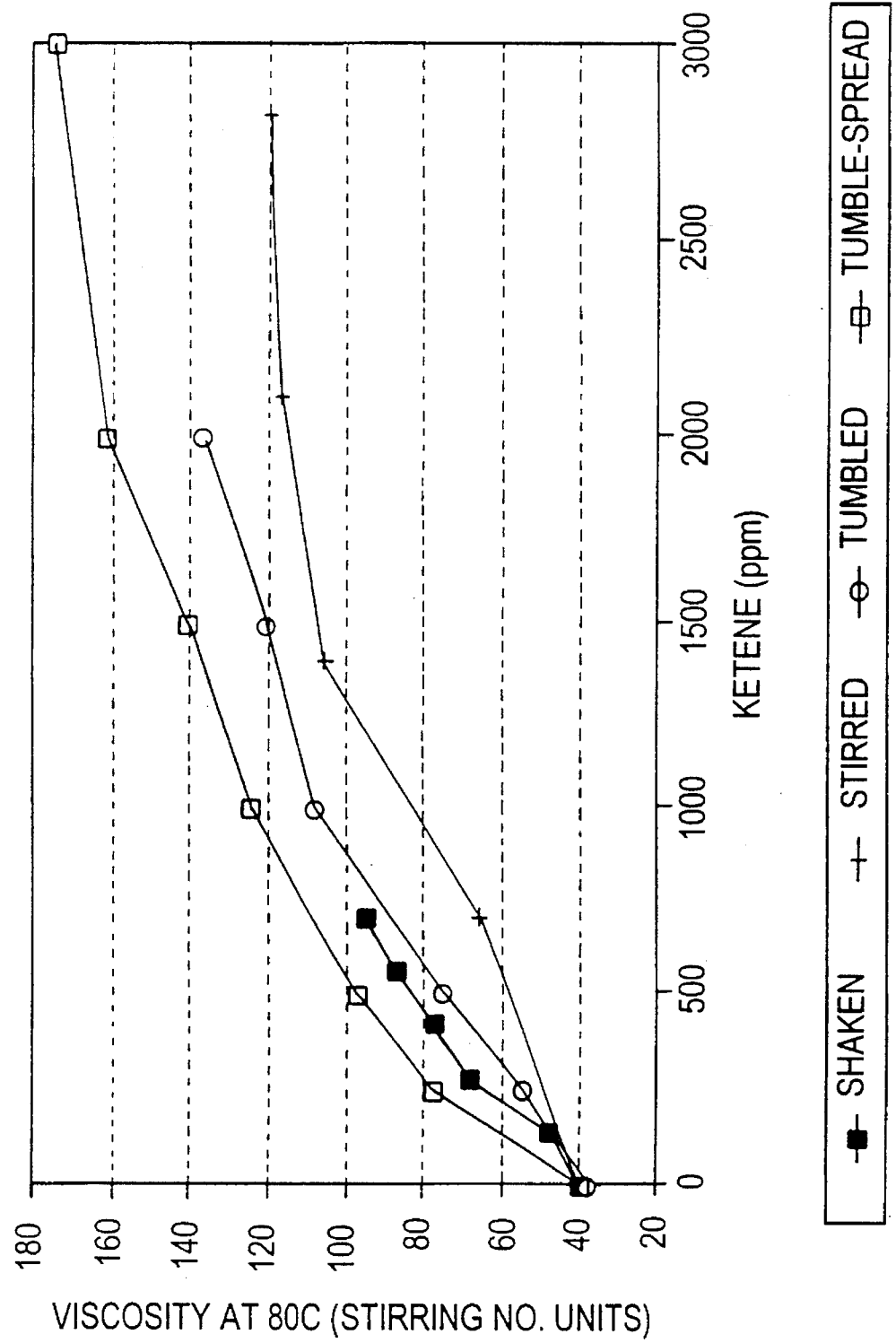
FIG. 3 illustrates Rapid Visco Analyser (RVA) properties of ketene-treated flour.
Figure 4:
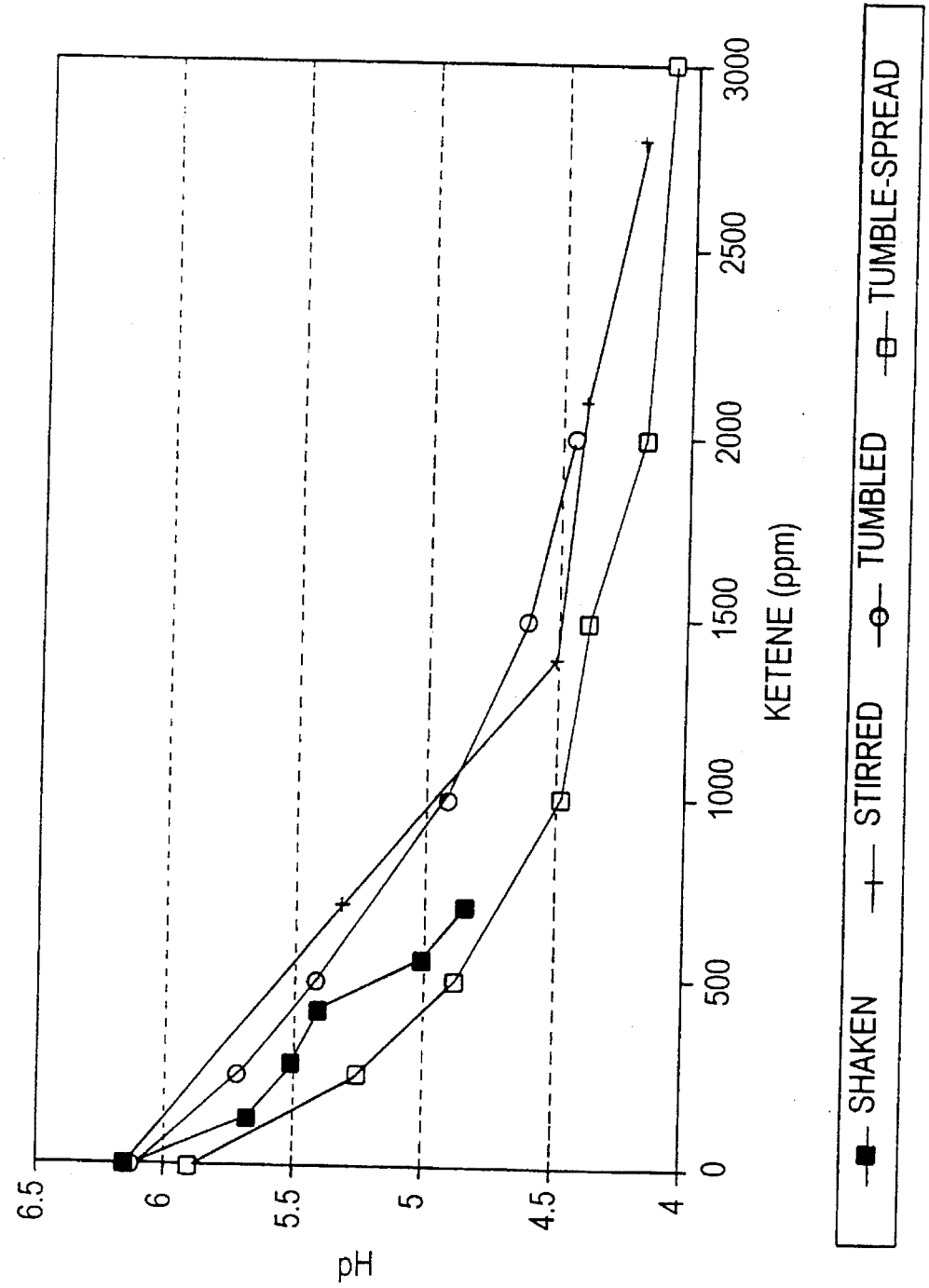
FIG. 4 illustrates the pH of ketene-treated flour.
Figure 5:
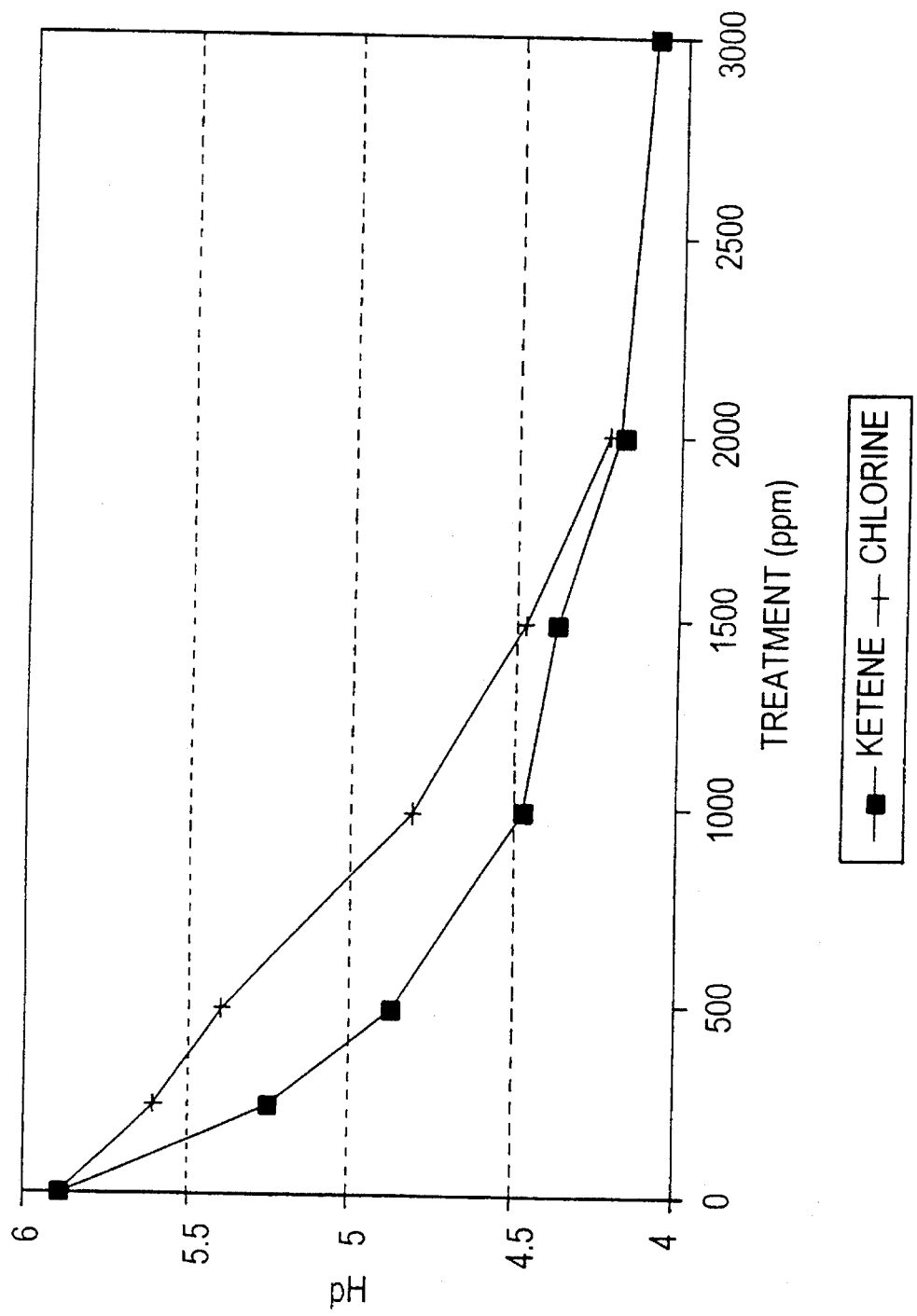
FIG. 5 illustrates the pH of ketene-treated and chlorine-treated flour.

Unpyrolysed acetone was removed by condensation, and ketene and methane were delivered in a stream of nitrogen gas directly to a vessel containing flour for treatment. Treatment was either by shaking to create a flour aerosol as the gas was passed down through an inverted sintered glass funnel with a filter-paper "floor", or by stirring as the gas was passed up through a bed of flour in a sintered glass funnel, or by tumbling in a wooden box normally used for chlorinating flour, or by tumble-spreading in a more sophisticated reactor for chlorinating flour which has its axis of rotation through a diagonal of the reactor box (Kissell and Marshall, 1972) and thereby mobilises the flour effectively and continuously presents fresh flour particles to the vapour stream. Flour particles were only mobilised to a limited extent by tumbling and even less by stirring. The results of ketene treatment as measured by Rapid Visco-Analysis (FIG. 3), and pH (FIG. 4) indicate that tumble-spreading was the most effective form of treatment followed by shaking, tumbling and then stirring. The optimum levels of treatment were 1000ppm using tumble-spreading and 1500 ppm using tumbling. A series of flours treated with ketene at levels up to 3000 ppm was compared with a series of flours treated with chlorine at up to 000 ppm in the same tumble-spreading apparatus. Ketene was more effective at lowering flour pH (FIG. 5) and raising RVA viscosity (FIG. 6) than chlorine.

TABLE 1

Test baking results of ketene-treated flours.

| Method of ketene-treatment | Optimum level of ketene-treatment (ppm) | Test baking method | Cake specific volume (% chlorinated control) |
|---|---|---|---|
| Tumble-spreading | 1000 | Unit | 98 |
| Shaking | 700* | Muffin | 99 |
| Tumbling | 1500 | Unit | 90 |
| stirring | 2100* | Muffin | 92 |

*Best treatment level test baked, may not be optimum.

Table 1 compares the results of test baking at the optimum level of treatment for the tumble-spread and tumbled flours and at the best treatment level test-baked for each type of treatment. Flour treated to 1000 ppm by tumble-spreading, 700 ppm by shaking or 1500 ppm by tumbling produced cakes which closely resembled those made from chlorinated flour both in terms of appearance and crumb structure. Baking unit-size cakes is a more stringent test of functionality than baking muffin-size cakes and so it was concluded that tumble-spreading was the most effective treatment procedure. 1000 ppm ketene-treated (tumble-spread) flour had almost identical baking performance and pH to 1500 ppm chlorine-treated (tumble-spread) flour, which is a typical treatment level for a commercial chlorinated flour. However 3000 ppm ketene-treated flour produced unit cakes with 91% of the specific volume and similar appearance and crumb structure to the chlorinated control, showing that functionality is relatively insensitive to overtreatment. These results show that treating flour in such a way that the flour particles exposed to the vapour stream change continuously leads to effective modification. They also show that ketene, an acylating agent which lowers the pH of flour, modifies flour to give it functionality comparable with chlorine-treated flour in high-ratio cakes.

Example 2

Acetic-anhydride-treated flour

Flour (250 g) was treated with 3640 ppm acetic anhydride (the molar equivalent of 1500 ppm ketene) by tumbling the flour in a roller bottle at 20rpm for 48 hours at room temperature. The liquid reagent was introduced into the bottle soaked onto a pad of quartz wool inside a stoppered glass-microfibre, solvent extraction thimble, such that the vapour could readily diffuse out and interact with the continuously shifting flour. The treated flour had a pH of 4.15, and its RVA viscosity at 80° C. was 100SNU (similar to 2000 ppm chlorinated flour). Unit cakes made from the acetic-anhydride-treated flour were similar in appearance and crumb structure to, and achieved 92% of the specific volume of, those made from chlorinated flour.

Flour was also treated with acetic anhydride in the tumble-spreading apparatus. In this case the apparatus was modified by fitting a glass-microfibre solvent extraction thimble over the end of the gas-delivery tube. Inside the thimble were a pad of quartz wool, and a teflon heating coil through which paraffin oil heated to 125° C. was pumped. Acetic anhydride was delivered into the thimble through a teflon delivery tube carried by a stream of nitrogen from a heated flask, partly as a vapour and partly as droplets of liquid. Flour was treated in the tumble-spreading apparatus in batches of up to 2.5 kg. Flour was treated in the apparatus for sufficient time to allow all the acetic anhydride to be delivered into the thimble and then to diffuse out as hot vapour into the continuously tumbling flour. This was typically 30 min. for treatment to 500 ppm. Unit cakes were baked using flour treated at levels of up to 6000 ppm. Unit cakes made using 4000 ppm acetic-anhydride-treated flour were similar in appearance, had a slightly closer crumb structure, and achieved 90% of the specific volume of cakes made using the same flour chlorinated at 1500 ppm. TPA of cakes made with treated flours showed that densities with 4000–6000 ppm acetic-anhydride-treated flour were only about 15% greater than those with 1000–2000 ppm chlorinated flour, hardness values with 3000–6000 ppm acetic-anhydride-treated flour were only about 20% greater than those with 500–2000 ppm chlorinated flour, gumminess and chewiness values with 3000–6000 ppm acetic-anhydride-treated flour were similar to those with 500–2000 ppm chlorinated flour, adhesiveness values with 4000–6000 ppm acetic-anhydride-treated-flour were similar to those with 500–2000 ppm chlorinated flour and recovery with 5000 ppm acetic-anhydride-treated flour was only 3.9% less than that with 2000 ppm chlorinated flour. These were also the treatment levels at which TPA results using the experimental flour were closest to those obtained using a commercial chlorinated flour. Other TPA measurements did not show a consistent dose response with treatment.

These results show that acetic anhydride, an acylating agent which lowers the pH of flour, modifies flour to give it good functionality in high-ratio cakes.

Example 3

Acetyl-chloride-treated flour

Flour was treated with 1400 ppm acetyl chloride vapour (the molar equivalent of 750 ppm ketene) by tumble-spreading in the reactor used for chlorinating flour and for the most effective of the ketene treatments. The vapour was delivered by a stream of nitrogen which had been bubbled through acetyl chloride. The treated flour had a pH of 4.14, and its RVA viscosity at 80° C. was 135SNU. Unit cakes made from the acetyl-chloride-treated flour were similar in appearance and crumb structure to, and had 94% of the specific volume of, those made from chlorinated flour. These results show that acetyl chloride, an acylating agent which lowers the pH of flour, modifies flour to give it good functionality in high-ratio cakes.

Example 4

Propionyl-chloride-treated flour

Flour was treated with 3300 ppm propionyl chloride vapour (the molar equivalent of 1500 ppm ketene) by tumble-spreading as in Example 3. The treated flour had a pH of 3.52, and its RVA viscosity at 80° C. was 150SNU. Unit cakes made from the propionyl-chloride-treated flour were similar in appearance and crumb structure to, and had 89% of the specific volume of, those made from chlorinated flour. These results show that propionyl chloride, an acylating agent which lowers the pH of flour, modifies flour to give it good functionality in high-ratio cakes.

Example 5

Methyl-chloroformate-treated flour

Flour was treated with 3380 ppm methyl chloroformate (the molar equivalent of 1500 ppm ketene) by tumbling the flour in a roller bottle at 20 rpm for 48 hours at room temperature as in Example 2. The treated flour had a pH of 3.09, and its RVA viscosity at 80° C. was 149SNU. Unit cakes made from the methyl-chloroformate-treated flour were similar in appearance and crumb structure to, and achieved 89% of the specific volume of, those made from chlorinated flour. These results show that methyl chloroformate, an acylating agent which lowers the pH of flour, modifies flour to give it good functionality in high-ratio cakes.

Example 6

Ethyl-isocyanate-treated and triethylamine/acetyl-chloride-treated flour

Flour was treated with 2540 ppm ethyl isocyanate (the molar equivalent of 1500 ppm ketene) by tumbling the flour in a roller bottle at 20 rpm for 48 hours at room temperature as in Example 2. The treated flour had a pH of 6.50, and its RVA viscosity at 80° C. was 61SNU (in between that of untreated flour and flour treated with chlorine or acylating agents which acidify flour). Unit cakes made from the ethyl-isocyanate-treated flour were not as collapsed or pasty as those made with untreated flour, but were softer and flatter topped than those made with flour treated with chlorine or acylating agents which acidify flour.

Flour was treated with 3610 ppm triethylamine (the molar equivalent of 1500 ppm ketene) by tumbling the flour in a roller bottle at 20 rpm for 48 hours at room temperature as in Example 2. The triethylamine-treated flour was treated with 1400 ppm acetyl chloride vapour (the molar equivalent of 750 ppm ketene) by tumble-spreading as in Example 3. The treated flour had a pH of 5.95, and its RVA viscosity at 80° C. was 118SNU. Unit cakes made from this flour were similar in appearance and crumb structure to, and achieved 96% of the specific volume of, those made from chlorinated flour. These results show that an acylating agent which raises the pH of flour, or treatment with base followed by an acylating agent so that flour is not exposed to pH lower than that of untreated flour, modifies flour to give it good functionality in high-ratio cakes, but not always as good as with chlorine or acylating agents which lower the pH of flour.

It was a general observation that all cakes in Examples 1–6 which had the appearance and internal structure of controls made with chlorinated flour, but had lower specific volumes by up to 10%, had higher batter relative density at the end of mixing than chlorinated controls. It was concluded that volume differences were most likely the result of differences in air incorporation during mixing, which might be overcome by minor process modifications, such as changing mixing time or speed.

Examples of bakery products made with modified flour

Unit-size cakes with flour:sugar ratios of 1:1.3 are a definitive test of the functionality associated with chlorinated flour. However chlorinated flour is also used in other bakery products, in which it performs better than untreated flour. Therefore other baking tests were used to show that the functionality of flour modified according to the general principles of this invention was as broad as with chlorinated flour.

Example 7

Angel cake (blending method)

| ANGEL CAKE | |
|---|---|
| Ingredient | % flour weight |
| Flour | 100 |
| Caster sugar | 130 |
| High-ratio shortening | 75 |
| Skimmed milk powder | 14 |
| Salt | 2.5 |
| Baking powder | 2.8 |
| Water | 36 |
| Cream powder | 1.25 |
| Reconstituted egg albumen | 100 |

The flour, sugar, fat, cream powder, baking powder and salt were mixed in a planetary mixer fitted with a beater for 1 min at 130 rpm and scraped down. The water and skimmed milk powder were added gradually over 1 min at 130 rpm, and then mixed for 4 min at 230 rpm. The albumen was added gradually over 2 min at 130 rpm and scraped down. Mixing was completed at 400 rpm for 3 min. Final batter relative density should be 0.7. 1250 g batter was deposited into paper-lined rectangular pans and the cakes were baked in a reel oven for 90 min at a temperature setting of 200° C.

Cake made with 1000 ppm-ketene-treated flour had the same shape, finer crumb structure, less-bleached crumb, and 87–91% of the specific volumes of cakes made with chlorinated flours, which differed in specific volume by These results show that flour modified according to this invention has good functionality in angel cakes made by a blending method.

Example 8

Madeira-type slab cake (all-in method)

| SLAB CAKE | |
|---|---|
| Ingredient | % flour weight |
| Flour | 100 |
| Caster sugar | 130 |

| SLAB CAKE | |
|---|---|
| Ingredient | % flour weight |
| High-ratio shortening | 75 |
| Skimmed milk powder | 15 |
| Salt | 2.5 |
| Baking powder | 3.1 |
| Water | 67.5 |
| Whole liquid egg | 100 |

All the ingredients were mixed in a planetary mixer fitted with a beater for 0.5 min at 130 rpm, scraped down, mixed for 1 min at 400 rpm, scraped down and then mixed for 1 min more at 400 rpm. Final batter relative density should be 0.7. 1250 g batter was deposited into paper-lined rectangular pans and the cakes were baked in a reel oven for 90 min at a temperature setting of 200° C.

Cake made with 1000 ppm-ketene-treated flour was similar in appearance and crumb structure to, and had 95–100% of the specific volume of those made from chlorinated flour, which differed in specific volume by 5%. These results show that flour modified according to this invention has good functionality in slab cakes.

Example 9

Angel cake (all-in method)

| ANGEL CAKE | |
|---|---|
| Ingredient | % flour weight |
| Flour | 100 |
| Caster sugar | 130 |
| High-ratio shortening | 75 |
| Skimmed milk powder | 14 |
| Salt | 2.5 |
| Baking powder | 2.8 |
| Water | 36 |
| Cream powder | 1.25 |
| Reconstituted egg albumen | 100 |

All the ingredients were mixed in a planetary mixer fitted with a beater for 0.5 min at 130 rpm, scraped down, mixed for 1 min at 400 rpm, scraped down and then mixed for 1 min more at 400 rpm. Final batter relative density should be 0.7. 1250 g batter was deposited into paperlined rectangular pans and the cakes were baked in a reel oven for 90 min at a temperature setting of 200° C. Cake made with 1000 ppm-ketene-treated flour had similar shape, finer crumb structure, less-bleached crumb, and 95–100% of the specific volumes of cakes made with chlorinated flours, which differed in specific volume by 5%. These results show that flour modified according to this invention has good functionality in angel cakes made by the all-in method.

Example 10

Blueberry muffins

| BLUEBERRY MUFFINS | |
|---|---|
| Ingredient | % flour weight |
| Flour | 100 |
| Caster sugar | 60 |
| Baking powder | 5 |
| Salt | 1.25 |
| Skimmed milk powder | 2 |
| Vegetable oil | 40 |
| Whole liquid egg | 70 |
| Water | 35 |
| Frozen blueberries | 55 |

The flour, sugar, baking powder, salt and skimmed milk powder were sieved. The egg, water and oil were blended and gradually added to the dry ingredients in a planetary mixer fitted with a beater over 3 min. at rpm. The mixture was scraped down and mixed for a further 4 min. at 130 rpm. The frozen blueberries were added by hand and 80 g batter was deposited into lined muffin tins. The cakes were baked in a reel oven for 35 min. at a temperature setting of 230° C.

Cakes made with 1000 ppm-ketene-treated flour had the same shape, volume, even crumb structure and well distributed fruit as cakes made with chlorinated flour. In cakes made with untreated flour, shape volume and crumb structure was only slightly inferior, but notably all the fruit had sunk to the base of the cake. These results show that flour modified according to this invention has good functionality in blueberry muffins.

Example 11

High-ratio swiss roll

| HIGH-RATIO SWISS ROLL | |
|---|---|
| Ingredient | % flour weight |
| Flour | 100 |
| Caster sugar | 106 |
| Baking powder | 5 |
| Skimmed milk powder | 8 |
| Salt | 1 |
| Vegetable oil | 3 |
| Whole liquid egg | 61 |
| Water (tap) | 45 |
| Glycerol monostearate | 2.6 |
| Water (distilled) | 15 |

The oil, egg and tap water were placed in the bowl of a planetary mixer fitted with a whisk, and then the flour, caster sugar, baking powder, skimmed milk powder and salt were added. They were mixed for 0.5 min. at 130 rpm, scraped down and mixed for a further 2 min. at 400 rpm. The glycerol monostearate was dispersed in the distilled water and added to the mixture over 10 sec. while mixing at 130 rpm. The mixture was mixed for 0.5 min. at 400 rpm, scraped down and then mixed for 0.25 min. at 400 rpm. Final batter relative density should be 0.60–0.65. 500g batter was spread on a 13"×17" greaseproof-paper-lined tray, and the cakes were baked in a reel oven for 8 min. at a temperature setting of 238° C.

Swiss rolls baked using 3000 ppm acetic-anhydride-treated flour had slightly better shape and crumb structure than swiss rolls made using the same flour chlorinated at levels up to 2000 ppm. These results show that flour treated according to this invention has good functionality in swiss rolls.

Example 12

Enriched sponge cake

| ENRICHED SPONGE CAKE | |
|---|---|
| Ingredient | % flour weight |
| Flour | 100 |
| Caster sugar | 105 |
| Whole liquid egg | 60 |
| Water (tap) | 35 |
| Skimmed milk powder | 8 |
| Vegetable oil | 15 |
| Salt | 1 |
| Baking powder | 5 |
| Glycerol monostearate | 2.6 |
| Water (distilled) | 15 |

The oil, egg and tap water were placed in the bowl of a planetary mixer fitted with a whisk, and then the flour, caster sugar, baking powder, skimmed milk powder and salt were added. They were mixed for 0.5 min. at rpm, scraped down and mixed for a further 2 min. at rpm. The glycerol monostearate was dispersed in the distilled water and added to the mixture over 10 sec. while mixing at 130 rpm. The mixture scraped down and then mixed for 0.75–1.00 min. at 400 rpm. Final batter relative density should be 0.7. 200g batter was deposited into greaseproof-paper-lined round pans, and the cakes were baked in a reel oven for 18 min. at a temperature setting of 238° C.

Cakes made with 3000 ppm acetic-anhydride-treated flour had similar volume and appearance to cakes made with 1500 ppm chlorinated flour. TPA of cakes made with treated flours showed that densities with 1500–6000 ppm acetic-anhydride-treated flour were similar to those with 500–2000 ppm chlorinated flour, hardness with 4000 ppm acetic-anhydride-treated flour was similar to values with 1500–2000 ppm chlorinated flour, and recovery values with 2000–4000 ppm acetic-anhydride-treated flour were similar to that with 1000 ppm chlorinated flour. These were also the treatment levels at which TPA results using the experimental flour were closest to those obtained using a commercial chlorinated flour. Other TPA measurements did not show a consistent dose response with treatment. These results show that flour modified according to this invention has good functionality in enriched sponge cakes.

Example 13

Wafer sheets

| WAFER SHEETS | |
|---|---|
| Ingredient | % flour weight |
| Flour | 100 |
| Water | 146.8 |
| Powdered lecithin | 0.95 |
| Groundnut oil | 2.38 |
| Salt | 0.24 |
| Sodium bicarbonate | 0.32 |

The water was placed in the standard bucket of a Silverson Type AXR mixer. The mixer was inserted so the propeller was 25–35mm from the base of the bucket. The lecithin, oil, salt and sodium bicarbonate were added with the mixer running at low speed, and then the mixer speed was increased to maximum for 0.5 min. With the mixer still running the flour was added in three portions of 280 g each. Each portion was allowed to clear before the next was added. The sides of the bucket and the mixer supports were scraped down repeatedly during mixing. Total mixing time was approximately 4 min. and the final batter temperature was 24–26° C.

Batter viscosity was checked using a Ford Cup No. B5. The time taken for a brim-filled cup containing a representative sample of wafer batter to drain until the flow changed from a continuous stream to discreet drops was measured. The target time was 60±10 sec.

The batter was deposited in 132g portions on to a plate set at 1.78 mm, and baked for 1.5 min. at temperature settings of 220° C. for the top plate and 200° C. for the bottom plate. After baking the edges of each sheet were trimmed with a sharp knife and sheets were allowed to cool in air for 1 min. before placing in a perspex box. Wafers were allowed to stand for a minimum of 30 min. before texture measurement.

Wafer texture was measured as the time taken to saw through a stack of ten wafers using a Baker Perkins saw-blade texture meter.

Wafers made with 1500 ppm-acetic-anhydride-treated flour had the same texture as wafers made with a commercial biscuit flour. This result shows that flour modified according to this invention can be used to make satisfactory wafer sheets.

Example 14

Crumpets

| CRUMPETS | |
|---|---|
| Ingredients | % flour weight |
| Breadmaking flour | 70 |
| High-ratio cake flour (modified/chlorinated/untreated) | 30 |
| Salt | 2 |
| Baking powder | 2.5 |
| Yeast | 5.5 |
| Caster sugar | 0.7 |
| Water | 144 |

The yeast was dispersed in the water. The flour, salt, baking powder and caster sugar were placed in the bowl of a planetary mixer fitted with a beater and mixed for 1 min. at 130 rpm. The yeast suspension was added to the ingredients in the mixer bowl and mixed to form a lump-free paste. The batter was mixed for 3 min. at rpm, scraped down and mixed for a further 3 min. at rpm. The final batter temperature was 25° C. It was covered and allowed to ferment for 35 min. The batter was deposited into 9 cm diameter round pans and baked on a hot plate for 7 min. at a temperature setting of 190° C.

Crumpets baked using flour treated with up to 4000 ppm acetic-anhydride had similar colour and internal structure to those made using flour treated with up to 2000 ppm chlorine. These results show that flour modified according to this invention can be used to make satisfactory crumpets.

Example 15

High-ratio fruit cakes

| HIGH-RATIO FRUIT CAKE | |
|---|---|
| Ingredient | % flour weight |
| Flour (high protein) | 100 |

HIGH-RATIO FRUIT CAKE

| Ingredient | % flour weight |
| --- | --- |
| Caster sugar | 120 |
| Baking powder | 2.5 |
| Salt | 2.5 |
| Skimmed milk powder | 5.8 |
| High-ratio fat | 50 |
| Egg | 80 |
| Water | 59 |
| Tartaric acid | 0.7 |
| Fruit | 140 |

The dry ingredients were sieved. The flour, fat and baking powder were placed in the bowl of a planetary mixer fitted with a beater and mixed for 4 min. at 130 rpm. The sugar, salt, ⅔ of the milk powder and ⅔ of the water were blended together and added to the ingredients in the mixer bowl over 0.5 min. while mixing at 130 rpm. The batter was scraped down and mixing was continued for a further 3 min. at 260 rpm. The remaining milk powder, water and tartaric acid were blended together and added to the ingredients in the mixer bowl over 10 sec. while mixing at 130 rpm. The batter was scraped down and mixing was continued for a further 1.5 min. at 130 rpm. The fruit was added to the batter over 20 sec. while mixing at 130 rpm. 450g batter was deposited into greaseproof-paper-lined pans and the cakes were baked in a reel oven for 70 min. at a temperature setting of 200° C.

Cake made with 1000 ppm-ketene-treated flour had similar shape, crumb structure and well-distributed fruit, and 98% of the specific volume of cakes made with commercial chlorinated "Hi-Frute" flour. These results show that flour modified according to this invention has good functionality in high-ratio fruit cakes.

References

Cauvain, S. P., Hodge, D. G., Muir, D. D. and Dodds, N. J. H., 1976, British Patent No. 1 444 173.
Greenwell, P., 1993, FMBRA Annual Report and Accounts 1992, 9–11.
Greenwell, P. and Brock, C. J., 1993, Cereal Foods World, 38, 615–616 (abstract).
Kissell, L. T. and Marshall, B. D., 1972, Cereal Science Today, 17, 152–155, 161.
Montzheimer, J. W., 1931, Cereal Chem. 8, 510–517.
Nakamura, K., Neishi, H., Nakagawa, Y., Shibuta, T. and Inagami, K., 1982, UK Patent No. 2 002 222 B.
Rubio, M. J., 1975, U.S. Patent No. 3 859 449.
Russo, J. V. and Doe, C. A. F., 1968, British Patent No. 1 110 711.
Seguchi, M., 1987, Cereal Chem., 64, 281–282.
Seguchi, M., 1993, Cereal Foods World, 38, 493–497.
Sollars, W. F., 1958, Cereal Chem. 35, 100–110.
Sollars, W. F. and Rubenthaler, G. L., 1971, Cereal Chem. 397–410.

We claim:

1. A method of improving the baking properties of flour, which comprises contacting the flour with an acylating reagent in an amount effective to produce an improved flour for use in high ratio baking products.

2. A method as claimed in claim 1, in which the flour is wheat flour, barley flour, or rye flour.

3. A method as claimed in claim 1, in which the flour is agitated during contacting so as to continuously change the flour surface exposed to the acylating reagent.

4. A method as claimed in claim 1, in which the acylating reagent is one which lowers the pH of flour.

5. A method as claimed in claim 1, in which the acylating reagent is selected from the group consisting of ketene, acetic anhydride, acetyl chloride, propionyl chloride, and methyl chloroformate.

6. A method as claimed in claim 1, in which the acylating reagent is used in proportion of 250 to 6000 parts per million by weight (ppm) based on the weight of flour.

7. A method as claimed in claim 1, in which the contacting is carried out with ketene at 250 to 3000 ppm, acetic anhydride at 250 to 6000 ppm, acetyl chloride at 250 to 2800 ppm, propionyl chloride at 250 to 3300 ppm or methyl chloroformate at 250 to 3380 ppm.

8. Flour which has been treated by a method as claimed in claim 1.

9. A product which has been baked or otherwise cooked using flour as claimed in claim 8.

10. A baked product as claimed in claim 9, which is a high-ratio cake.

11. A method of improving the baking properties of flour, which comprises contacting the flour with a gaseous acylating reagent or with the vapor from a liquid acylating agent in an amount effective to produce an improved flour for use in high ratio baking products.

12. A method of improving the baking properties of flour, which comprises contacting the flour with 250 to 6000 ppm by weight of a gaseous acylating reagent or of the vapor from a liquid acylating reagent.

13. A method as in claim 6, in which the acylating reagent is used in proportion of from 250 to 4000 ppm based on the weight of the flour.

* * * * *